United States Patent
Schirrmacher et al.

(10) Patent No.: US 9,014,159 B2
(45) Date of Patent: Apr. 21, 2015

(54) DEVICE FOR PROVIDING RADIOFREQUENCY SIGNAL CONNECTIONS

(75) Inventors: Martin Schirrmacher, Buxtehude (DE); Andreas Frohn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 371 days.

(21) Appl. No.: 13/544,500

(22) Filed: Jul. 9, 2012

(65) Prior Publication Data

US 2012/0327921 A1    Dec. 27, 2012

Related U.S. Application Data

(63) Continuation of application No. PCT/EP2011/050467, filed on Jan. 14, 2011.

(60) Provisional application No. 61/294,985, filed on Jan. 14, 2010.

(30) Foreign Application Priority Data

Jan. 14, 2010 (DE) .......................... 10 2010 000 909

(51) Int. Cl.
*H04W 4/00* (2009.01)
*B64D 11/00* (2006.01)
*H04B 1/00* (2006.01)
*H04B 1/52* (2006.01)

(52) U.S. Cl.
CPC .......... *B64D 11/0015* (2013.01); *H04B 1/0057* (2013.01); *H04B 1/52* (2013.01); *Y02T 50/46* (2013.01)

(58) Field of Classification Search
None
See application file for complete search history.

(56) References Cited

U.S. PATENT DOCUMENTS

| 2003/0009761 | A1  | 1/2003  | Miller et al. | |
|---|---|---|---|---|
| 2007/0259636 | A1* | 11/2007 | Fisher | 455/207 |
| 2007/0263578 | A1* | 11/2007 | Nakaso et al. | 370/338 |
| 2008/0039076 | A1* | 2/2008  | Ziarno et al. | 455/431 |
| 2009/0100476 | A1* | 4/2009  | Frisco et al. | 725/68 |

FOREIGN PATENT DOCUMENTS

| CN | 101438505 | 5/2009 |
|---|---|---|
| CN | 101502197 | 8/2009 |

(Continued)

OTHER PUBLICATIONS

International Search Report for Application Serial. No. PCT/EP2011/050467 dated Apr. 15, 2011.

(Continued)

*Primary Examiner* — Andrew Lai
*Assistant Examiner* — Leon Andrews
(74) *Attorney, Agent, or Firm* — Jenkins, Wilson, Taylor & Hunt, P.A.

(57) ABSTRACT

A device for providing radiofrequency signal connections for users comprises a plurality of access points which transmit or receive radiofrequency signals in different predetermined radiofrequency bands and are each connected via a transmission and reception signal path to at least one shared transmitting and receiving antenna, a filter being provided in the transmission and reception signal paths respectively and isolating the radiofrequency bands sufficiently from one another and from predetermined mobile radio frequency bands.

23 Claims, 4 Drawing Sheets

(56) References Cited

FOREIGN PATENT DOCUMENTS

| DE | 103 45 436 | 5/2005 |
| DE | 10 2006 036082 | 2/2008 |
| EP | 2 017 966 | 1/2009 |
| WO | WO 02/101995 | 12/2002 |
| WO | WO 2009/046228 | 4/2009 |
| WO | WO 2011/086160 | 7/2011 |

OTHER PUBLICATIONS

German Office Action for Application Serial No. DE 10 2010 000 909.1-35 dated Jul. 15, 2012.
Chinese Office Action for Application No. 201180006046.9 dated Apr. 3, 2014.

* cited by examiner

Table

| Band | Frequency range | |
|---|---|---|
| | Start | Stop |
| 1 | 2110 | 2170 |
| 2 | 2300 | 2400 |
| 3<br>WLAN b/g | 2402 | 2483 |
| 4 | 2500 | 2700 |

FIG 4

DEVICE FOR PROVIDING RADIOFREQUENCY SIGNAL CONNECTIONS

CROSS-REFERENCE TO RELATED APPLICATIONS

This application is a continuation of and claims priority to PCT/EP2011/050467, filed Jan. 14, 2011, which claims the benefit of and priority to U.S. Provisional Application No. 61/294,985, filed Jan. 14, 2010, and German Patent Application No. 10 2010 000 909, filed Jan. 14, 2010, the entire disclosures of which are incorporated herein by reference.

FIELD OF THE INVENTION

The invention relates to a device for providing radiofrequency signal connections, in particular WLAN connections, for users located in a passenger cabin of an aircraft.

BACKGROUND OF THE INVENTION

In aircraft, in particular aeroplanes, wireless radio-linked transmission systems are increasingly being used, and provide communication within the aeroplane during flight or when the aeroplane is located on the ground. The communication partners are passengers or crew members, who are located for example in the passenger cabin of the aeroplane. During the flight, the passengers wish to use various data services, in which data have to be transmitted, by means of their portable terminals, such as laptops, smartphones, mobile radio devices or PDAs. In this context, the users' end devices transmit data via a radio interface and a transmitting and receiving antenna, which is provided in the passenger cabin, to a transmission system of the aeroplane, which is connected to a base station during flight by means of a satellite connection for example. Data are transmitted via the air interface between the transmitting and receiving antenna of the passenger cabin and the terminals by means of radiofrequency signals in predetermined radiofrequency bands. For example, for providing WLAN services, radiofrequency signals are transmitted or received in predetermined WLAN frequency bands.

Since the available frequency spectrum is limited, radiofrequency bands for different services are increasingly being arranged packed tightly together, and in many cases no distinct guard bands or protective frequency bands are provided between the various radiofrequency bands.

In an aeroplane, it is useful for the radiofrequency signals, which are transmitted in different radiofrequency bands which in some cases are very close to one another, to be brought together to a shared transmitting and receiving antenna which is provided or laid in the passenger cabin.

SUMMARY OF THE INVENTION

An idea of the present invention is therefore to provide a method and a device for providing radiofrequency signal connections for users in which the transmitted radiofrequency signals can be emitted and received by means of a common transmitting and receiving antenna without limiting their performance and without having a negative effect on one another.

In one embodiment of the device according to the invention, the filter means comprise channel filters for separating the radiofrequency bands from one another and band pass filters for isolating the radiofrequency bands from mobile radio frequency bands.

Therefore, one advantage of the device according to the invention is that as a result of the use of two different filters, namely a channel filter and a band pass filter which is connected thereto, a required filter gradient for each of the two filters for achieving a predetermined stop band attenuation can be relatively low, and thus the circuitry complexity when implementing filters of this type is relatively low. Moreover, the channel filters and the band pass filters, which only have to have a relatively low filter gradient in each case, are of a small installation size and can thus be accommodated in an available installation space, for example in an aeroplane. Moreover, filters of this type are of a relatively low weight, in such a way that fuel can be saved as a result if they are installed in an aeroplane, for example.

A further advantage of this embodiment, comprising a filter means which has a channel filter and a band pass filter for each signal path, is that these filters are already implemented for other purposes, and with appropriate rewiring can additionally be used for isolating the radiofrequency bands from one another and for isolating the radiofrequency bands from predetermined mobile radio frequency bands.

In one embodiment of the device according to the invention, the radiofrequency bands are WLAN frequency bands.

In one embodiment of the device according to the invention, the transmitting and receiving antenna is provided in the passenger cabin of the aeroplane, and provides WLAN connections for terminals of passengers or crew members who are located in the passenger cabin.

In one embodiment of the device according to the invention, the mobile radio frequency bands comprise mobile radio noise bands, in which noise signals are transmitted so as to prevent mobile radio connections of the terminals located in the passenger cabin to terrestrial base stations.

In one embodiment of the device according to the invention, the transmission and reception signals which are provided for the various radiofrequency bands are brought together by means of directional couplers, which are connected to at least one shared transmitting and receiving antenna.

In one embodiment of the device according to the invention, the directional couplers are what are known as 3 dB couplers.

In one embodiment of the device according to the invention, the 3 dB couplers are formed by hybrid combination circuits.

In an alternative embodiment of the device according to the invention, the 3 dB couplers are formed by what are known as Lange couplers.

In a further embodiment of the device according to the invention, the 3 dB couplers are Wilkinson couplers.

In one embodiment of the device according to the invention, the band pass filters comprise coupled cavity resonators or cavity filters or ceramic line resonators.

In one embodiment of the device according to the invention, a channel filter for separating radiofrequency bands, a band pass filter for isolating the radiofrequency bands from mobile radio frequency bands, and a directional coupler are provided in each transmission and reception signal path.

In one embodiment of the device according to the invention, the access points are provided in the aeroplane and connected via a network to an aeroplane server, which is connected to a ground station via a satellite link.

The access points may for example be WLAN access points.

In one embodiment of the device according to the invention, WLAN service signals in accordance with the standard IEEE 802.11g or IEEE 802.11b can be transmitted in the WLAN frequency bands.

In one embodiment of the device according to the invention, the radiofrequency bands, in particular the WLAN frequency bands, of the access points, in particular the WLAN access points, are non-overlapping frequency bands, in particular non-overlapping WLAN frequency bands.

In one embodiment of the device according to the invention, the band pass filters of different transmission and reception paths are provided in different band pass filter groups.

In one embodiment of the device according to the invention, at least two radiofrequency band groups, which each comprise at least one radiofrequency band, are connected to band pass filters, which are at a maximum frequency distance from one another and have predetermined mobile radio frequency bands.

In one embodiment of the device according to the invention, each of the directional couplers comprises two inputs, each of which is connected to a band pass filter group, and at least one output, which is connected to an associated transmitting and receiving antenna.

In one embodiment of the device according to the invention, the directional coupler comprises two outputs, which each emit, at half the signal power, the signals which are transmitted in the radiofrequency bands which are brought together.

In one embodiment of the device according to the invention, each of the two outputs of a directional coupler is connected to an associated transmitting and receiving antenna.

In one embodiment of the device according to the invention, the transmitting and receiving antenna is a leaky line antenna which is laid in the passenger cabin of the aeroplane.

In one embodiment of the device according to the invention, a measuring means is provided at one end of the leaky line antenna, and measures the signal power of high-frequency signals at one end of the leaky line antenna.

In one embodiment of the device according to the invention, data are transmitted in the transmission and reception signal paths at a data transfer rate of up to 54 Mbit/s in each case.

In one embodiment of the device according to the invention, a filter means consisting of a channel filter and a band pass filter has a stop band attenuation of more than 50 dB, preferably of more than 70 dB. This stop band attenuation makes it possible to operate all of the access points simultaneously at a maximum data transfer rate of up to 54 Mbit/s.

In one embodiment of the device according to the invention, the channel filters for separating the radiofrequency bands from one another are provided in a UWBS (universal wireless backbone system) unit or RF combination unit.

In one embodiment of the device according to the invention, the band pass filters for isolating the radiofrequency bands from mobile radio frequency bands are provided in an OBCE (on-board control equipment) unit of the aeroplane.

In one embodiment of the device according to the invention, three access points are provided, in particular three WLAN access points, and each transmit or receive radiofrequency signals, in particular WLAN signals, in an associated radiofrequency band, in particular a WLAN frequency band, the three radiofrequency bands, in particular WLAN frequency bands, being three non-overlapping radiofrequency bands, in particular IEEE 802.11 WLAN frequency bands, which each have a frequency bandwidth of 20 MHz.

In one embodiment of the device according to the invention, the OBOE (on-board control equipment) unit of the aeroplane comprises at least one directional coupler.

In one embodiment of the device according to the invention, the OBCE (on-board control equipment) unit of the aeroplane comprises directional couplers for bringing together the transmission and reception signal paths.

In one embodiment of the device according to the invention, the directional couplers comprise two outputs, which are each connected via a triplexer to a transmitting and receiving antenna.

In one possible embodiment of the device according to the invention, two channel filters of the UWBS (universal wireless backbone system) unit, which in each case are provided for one of the three radiofrequency bands, in particular IEEE 802.11 WLAN frequency bands, are connected via a signal combiner to a port of the OBCE (on-board control equipment) unit.

In one possible embodiment of the device according to the invention, the mobile radio frequency bands are 4G mobile radio frequency bands.

In one possible embodiment of the device according to the invention, said device comprises a UWBS (universal wireless backbone system) unit, which comprises channel filters for separating the radiofrequency bands from one another, and an OBOE (on-board control equipment) unit, which comprises the band pass filters for isolating the radiofrequency bands from the mobile radio frequency bands and directional couplers for bringing together the transmission and reception signal paths, the outputs of which are connected to transmitting and receiving antennas.

The invention provides an aeroplane, in particular a passenger aeroplane, or any other aircraft, for example a helicopter, comprising at least one device for providing radiofrequency signal connections for users, the aeroplane comprising a plurality of access points which transmit or receive radiofrequency signals in different predetermined radiofrequency bands and are each connected via a transmission and reception signal path to at least one shared transmitting and receiving antenna, which is laid in a passenger cabin of the aeroplane, filter means being provided in the transmission and reception signal paths respectively and isolating the radiofrequency bands from one another and from predetermined mobile radio frequency bands.

BRIEF DESCRIPTION OF THE DRAWINGS

In the following, embodiments of the device according to the invention for providing radiofrequency signal connections are described with reference to the appended drawings, in which.

DETAILED DESCRIPTION OF THE INVENTION

Figure 1:
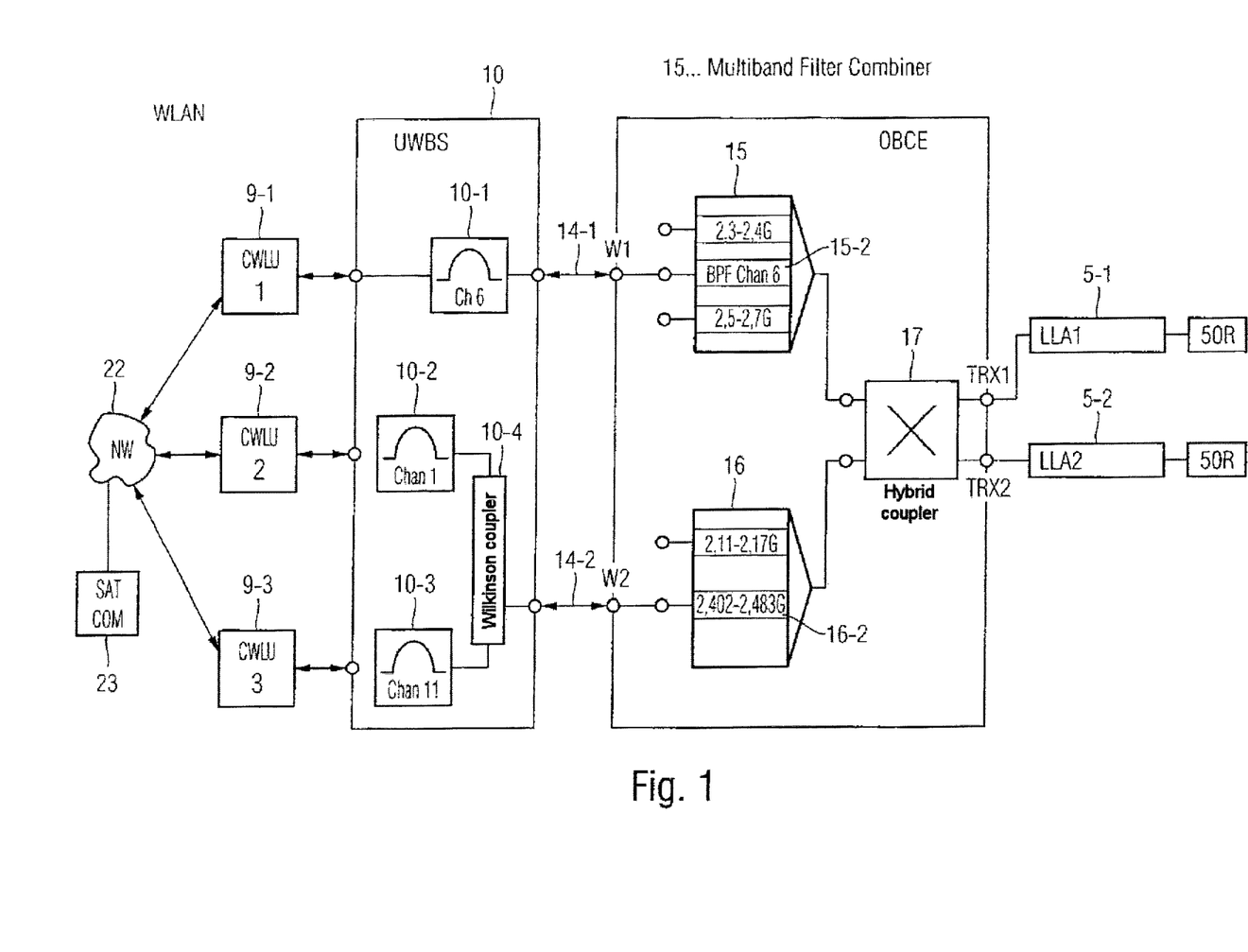
FIG. 1 is a block diagram illustrating a first possible embodiment of the device according to the invention.

As can be seen from the block diagram in FIG. 1, the device 1 according to the invention is provided for supplying radiofrequency signal connections in a vehicle 2, in particular in an aircraft, for example a passenger aeroplane. The aeroplane 2 comprises a passenger cabin 3, in which aeroplane passengers and crew members may be located. The passengers and crew members have mobile terminals, such as mobile telephones, smartphones, laptops, PDAs and the like. In the example shown in FIG. 1, three mobile terminals 4-1, 4-2 and 4-3 are shown in the passenger cabin 3. At least one transmitting and receiving antenna 5-*i* is further provided in the passenger cabin 3. In the embodiment shown in FIG. 1, two transmitting and receiving antennas 5-1, 5-2 are provided in the passenger cabin 3. These transmitting and receiving antennas 5-1, 5-2 are laid in the passenger cabin 3. The transmitting and receiving antenna 5-*i* may for example be what is known as a leaky line antenna. The mobile terminals 4-*i* within the cabin 3 can exchange data with the leaky line antenna 5-*i* via air interfaces.

In the embodiment shown in FIG. 1, the two transmitting and receiving antennas 5-1, 5-2 are connected directly to the OBOE unit 8. In the embodiment shown in FIG. 1, the first transmitting and receiving antenna 5-1 is used to transmit and receive radiofrequency signals, in particular WLAN frequency signals, which are for example in the 2 GHz range. For WLAN signals which are in other frequency ranges, the antenna 5-1 may also serve as a transmitting antenna. The second antenna 5-2 is used as a transmitting and receiving antenna for radiofrequency signals which are in the 2 GHz range. For radiofrequency signals which are in other frequency ranges, the antenna 5-2 can be used as a receiving antenna.

In the embodiment shown, the device 1 according to the invention is of importance for providing radiofrequency signal connections in the 2 GHz range. In the embodiment shown, these radiofrequency signals or WLAN signals in the 2 GHz region originate from access points 9-1, 9-2, 9-3. These access points 9-*i* are preferably WLAN access points (AP). The WLAN signals which are to be transmitted in the 2 GHz frequency range are exchanged between a UWBS (universal wireless backbone system) unit 10 and the respective WLAN access point 9-*i* via a bidirectional signal connection 10-*i*. As is shown in FIG. 1, the WLAN access points 9-1, 9-2, 9-3 are connected to the UWBS unit 10 via signal connections 11-1, 11-2, 11-3. The bidirectional signal connections 11-*i* may for example be coaxial cables. The WLAN access points 9-*i* may be installed in a rack of the aeroplane 2.

The WLAN signals which are emitted in the 2 GHz range by the WLAN access points 9-1, 9-2, 9-3 are in predetermined WLAN frequency bands, and are filtered in the UWBS unit 10 by means of channel filters 10-1, 10-2, 10-3 which are integrated therein. These channel filters 10-1, 10-2, 10-3 may be analogue band pass filters for the respective radiofrequency or WLAN frequency band.

The WLAN frequency bands may for example be IEEE 802.11g or IEEE 802.11b frequency bands. In the example shown in FIG. 1, the WLAN access point 9-1 emits a WLAN signal in a channel 6 to a channel filter 10-1 which is provided for said channel. The WLAN access point 9-2 further emits a WLAN signal in a channel 1 to a channel filter 10-2 which is provided for said channel. The third WLAN access point 9-3 emits a WLAN signal in a channel 11 to the associated channel filter 10-3 within the UWBS unit 10. The WLAN signals emitted in the channels 1, 6, 11 are thus WLAN signals, which are in non-overlapping frequency bands. In the embodiment shown, the various WLAN frequency bands have a frequency bandwidth of approximately 20 MHz, the various WLAN channels being offset from one another by 5 MHz in each case. The WLAN channels 1, 6 and 11 therefore have no overlap. The UWBS unit 10 thus comprises three WLAN b/g channel filters 10-1, 10-2, 10-3 for the channels 6, 1, 11. After the respective channel filtering thereof, the WLAN channels 1, 11 are passed by the channel filters 10-2, 10-3 in the embodiment shown in FIG. 1 through a 2:1 signal combiner 10-4 to a port (W2) of the OBOE unit 8. In the embodiment shown in FIG. 1, the OBOE unit 8 comprises two ports W1, W2, which are connected to the UWBS unit 10. The connections between the UWBS unit 10 and the OBOE unit 8 can be produced by means of two plug-in connectors 14-1, 14-2.

The OBCE unit 8 comprises band pass filters for isolating the radiofrequency bands, in particular WLAN frequency bands, of mobile radio frequency bands.

In the embodiment shown in FIG. 1, the OBOE unit 8 comprises two band pass filter groups 15, 16. In each band pass filter group 15, 16, a plurality of band pass filters 15-*i*, 16-*i* are provided. These band pass filters isolate the WLAN frequency bands from mobile radio frequency bands, for example from 4G mobile radio frequency bands. Service signals, but also noise signals, may be transmitted in the mobile radio frequency bands. Noise signals are transmitted in mobile radio noise bands, and prevent mobile radio connections of the terminals 4-*i* located in the passenger cabin 3 to terrestrial base stations. An OMTS (on-board mobile telephone system) located in the aeroplane 2 supports frequency ranges which have been exposed to a noise signal in this manner. These include, among others, a frequency range of 2.3 to 2.4 GHz and a frequency range of 2.5 to 2.7 GHz. These two frequency ranges are almost seamlessly adjacent to a WLAN b/g frequency range of 2.402 to 2.483 GHz, which is used by the CWLU (cabin wireless LAN unit) units or WLAN access points 9-*i*. The band pass filter group 15 shown in FIG. 1 further has a band pass filter 15-1 in a frequency range of 2.3 to 2.4 GHz. This frequency range is a noise frequency range for transmitting noise signals or masking signals for mobile radio devices. A band pass filter 15-2 for the WLAN channel 6 is further provided in the band pass filter group 15. In addition, a third band pass filter 15-3 for the frequency range from 2.5 to 2.7 GHz can be seen, and noise signals for masking mobile radio connections are transmitted in this frequency range too. A band pass filter 16-1 is also provided in the second band pass filter group 16, and covers a frequency range of 2.11 to 2.17 GHz in the range shown. This frequency range is a noise frequency band for UMTS telephony. The second band pass filter group 16 further comprises a band pass filter 16-2 for the WLAN channel 1 and the WLAN channel 11, which is provided for the WLAN signals which are emitted in the 2 GHz range by the WLAN access points 9-2, 9-3. In the embodiment shown in FIG. 1, a shared band pass filter 16-2 is provided for the two WLAN channels 1, 11 which are brought together by means of the combiner 10-4. In an alternative embodiment, a separate band pass filter is provided in the band pass filter group 16 for each of the two WLAN channels 1, 11.

The OBCE unit of the aeroplane comprises at least one directional coupler 17. The directional coupler 17 is preferably a 3 dB coupler. In one possible embodiment, the 3 dB coupler is what is known as a hybrid combination circuit. In an alternative embodiment, the 3 dB coupler 17 is what is known as a Lange coupler.

Figure 2:
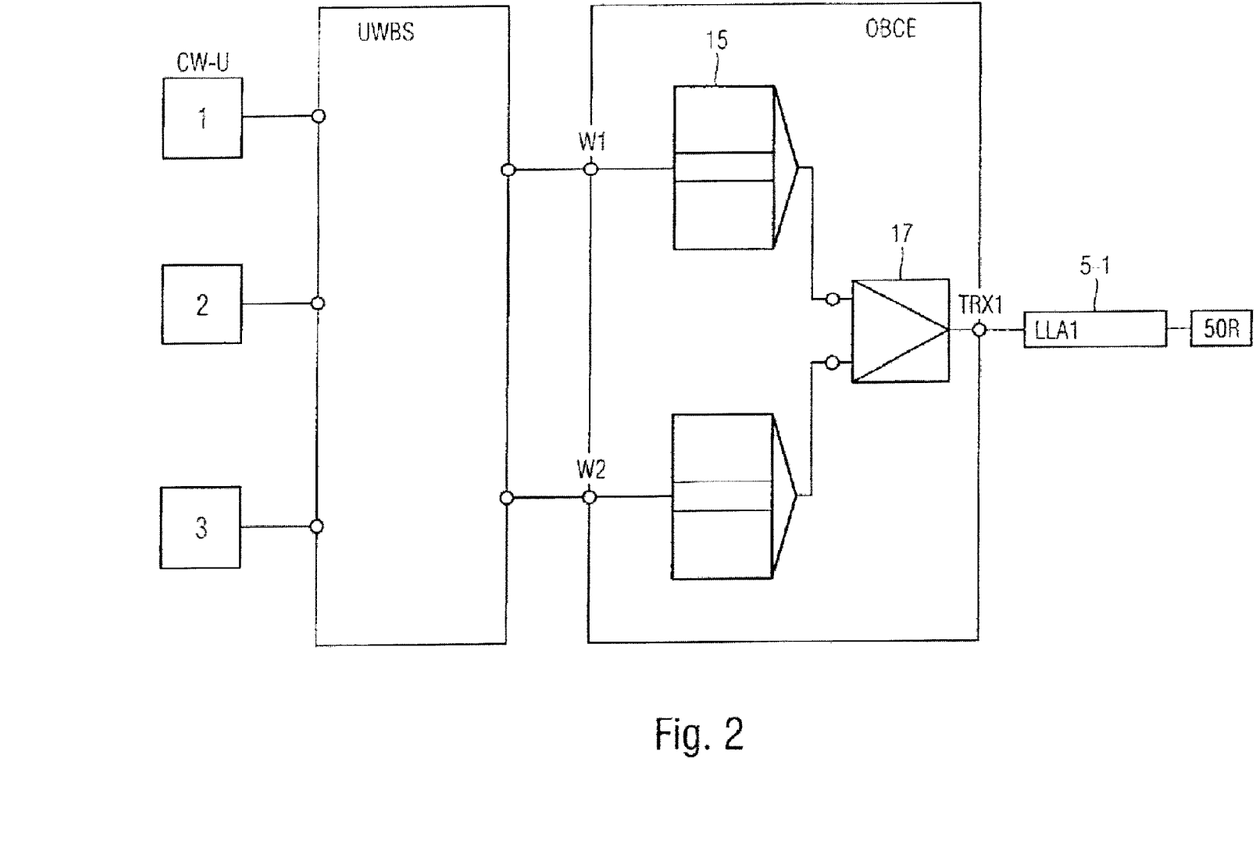
FIG. 2 is a further block diagram of a second possible embodiment of the device according to the invention.

In a further embodiment, which is shown in FIG. 2, the directional coupler 17 may also be formed by a Wilkinson coupler.

By means of the directional coupler 17, signals can be coupled out separately in a conductor in accordance with the propagation thereof. A directional coupler normally has four ports or gates. A signal or a signal wave which is fed in at one gate of the directional coupler is divided between the two gates on the opposite side of the directional coupler 17, in terms of the axis of symmetry, in a predetermined ratio, whilst being coupled out at the other gate on the same side on which it was fed in. The signal line which is fed in at one gate is divided between the two output gates of the directional coupler 17. In a preferred embodiment, the directional couplers 17 each provide a uniform division of the signal power between the two output gates. In this way, the signal is attenuated by 3 dB at both output gates, and in this case what is known as a 3 dB coupler is involved. In the embodiment shown in FIG. 1, the directional coupler 17 is provided for a particular frequency range. In one possible embodiment, the first directional coupler 17 is provided for a frequency range of 1.5 to 2.7 GHz. The directional coupler 17 comprises two outputs. These two outputs may be connected via a triplexer to the transmitting and receiving antennas 5-1, 5-2.

Base stations for mobile radio or GSM transmission may further be connected to the OBCE unit 8.

In one possible embodiment, the access points 9-$i$, in particular WLAN access points 9-$i$, are connected via a network 22 to a flight server 23, which is connected via a satellite link 24 to a ground station 25.

The device 1 according to the invention thus comprises a plurality of access points 9-$i$, which transmit or receive radiofrequency signals, in particular WLAN signals, in different radiofrequency bands and are each connected via a transmission and reception signal path to at least one shared transmitting and receiving antenna 5-$i$. By way of example, the WLAN access point 9-1 is connected to the transmitting and receiving antenna 5-1, in a signal path via a channel filter 10-1, plug-in connection 14-1, band pass filter 15-2, directional coupler 17, and optionally via a triplexer and a low pass filter. The two remaining WLAN access points 9-2, 9-3 are connected to the same transmitting and receiving antenna 5-1 as the WLAN access point 9-1, in a further signal path via channel filters 10-2, 10-3 and signal combination circuit 10-4, plug-in connection 14-2, band pass filter 16-2, directional coupler 17 and optionally a triplexer and a low pass filter. The transmitting and receiving antenna 5-1, which is laid in the passenger cabin 3, thus transmits and receives signals of all three WLAN access points 9-1, 9-2, 9-3. The same applies to the second transmitting and receiving antenna 5-2, which is optionally also laid in the passenger cabin 3, so as to minimise signal fading.

In the device 1 according to the invention, a respective filter means is provided in each transmission and reception signal path, and isolates the radiofrequency bands or WLAN frequency bands from one another and from predetermined mobile radio frequency bands, in particular mobile radio noise bands. This filter means comprises channel filters 10-$i$ for separating the radiofrequency bands or WLAN frequency bands from one another and band pass filters 15-$i$, 16-$i$ for isolating the radiofrequency bands from the mobile radio frequency bands, in particular from mobile radio noise bands. In the embodiment shown in FIG. 1, the channel filters 10-$i$ are located in the UWBS unit 10, and the band pass units 15-$i$, 16-$i$ of the two band pass filter groups 15, 16 are located in the OBOE unit 8. The band pass filters 15-$i$, 16-$i$ may be coupled cavity resonators or what are known as cavity filters. As can be seen in FIG. 1, a channel filter 10-$i$ for separating radiofrequency bands, a band pass filter 15-$i$ or 16-$i$ for isolating the radiofrequency bands from mobile radio frequency bands, and a directional coupler 17 are provided in each transmission and reception signal path. For example, a channel filter 10-1 for the WLAN channel 6 is provided in the transmission and reception signal path for the WLAN access point 9-1, along with a band pass filter 15-2 connected in series therewith for said channel, the band pass filter 15-2 being provided for isolating the WLAN frequency band or WLAN channel from a mobile radio frequency band, namely a mobile radio noise band. Further, this signal path leads via the directional coupler 17 to the shared transmitting and receiving antenna 5-1. This transmission and reception signal path thus comprises, in series, a channel filter 10-1, a band pass filter 15-2 and a directional coupler 17. Since the channel filter and a band pass filter are connected in series, for example a channel filter 10-1 and the band pass filter 15-2, each of the two filters only requires a relatively low filter gradient per se so as nevertheless to achieve a sufficiently high stop band attenuation of over 50 dB, preferably over 70 dB, in the signal path. The high stop band attenuation or rejection which results from connecting the channel filter and the band pass filter in series makes it possible to transmit data in the respective WLAN channels at a data transfer rate of up to 54 Mbit/s. The technical complexity of implementing the channel filter and the associated band pass filter, which each require only a relatively low filter gradient, can be reduced. In particular, the band pass filters which consist of coupled cavity resonators or cavity filters can be produced with a relatively small installation size. This makes it possible to accommodate the band pass filters or cavity filters in the available installation space of the aircraft 2.

Further, the small size of the filters saves weight, and thus minimises the fuel consumption in an aircraft 2.

As can be seen in FIG. 1, three radiofrequency channels which are to be transmitted, in particular WLAN b/g channels, are divided between two different signal paths by means of the ports W1, W2 of the OBCE unit, supplied to the band pass filter groups 15, 16 of the OBOE unit 8 separately via the two ports, and subsequently brought together by means of a directional coupler 17 and passed to the two antenna ports A1, A2 or TRX1, TRX 2 of the OBCE unit in equal signal proportions in each case.

In the embodiment shown in FIG. 1, the WLAN channel 6 is separated from WLAN channels 1 and 11 and passed to the band pass filter group 15, which simultaneously filters the OBOE noise bands at 2.4 GHz and 2.5 GHz. By limiting the WLAN signal on channel 6 to a center frequency of 2.337 MHz and a bandwidth of approximately 18 MHz, the band pass filter group 15 can be implemented with a relatively low filter gradient and a small space requirement, whilst simultaneously providing the required isolation from the OBOE signal sources at 2.4 and 2.5 GHz. Because the required WLAN neighbouring channel attenuation is divided between two separate filters, namely a WLAN channel filter and a band pass filter, the requirement on each of the individual filters is mitigated, in such a way that they can be implemented with a relatively low technical complexity.

In the embodiment shown in FIG. 1, after the respective channel filtering thereof, the WLAN channels 1 and 11 are brought together or interconnected by the filters 10-2, 10-3 via a signal combiner 10-4 and passed to the WLAN band pass filter 16-2 in the band pass filter group 16. The use of a 2:1 signal combiner additionally offers the advantage that the isolation between the two channels can be increased by the value of the isolation induced by the combiner. The two WLAN channels 1, 11 additionally have twice the frequency distance between the center frequencies (of 55 MHz), and as a result the effect of the channel filter is much greater than between the WLAN channel 1 and the WLAN channel 6 with a distance of only 25 MHz. The second band pass filter group 16 receives, as adjacent noise bands, the frequency band from 2110 to 2170 MHz and possibly also the frequency band from 3400 to 3600 MHz. The two noise bands have a sufficiently large frequency distance from the WLAN frequency band, in such a way that it is also possible to provide the required isolation of the signal sources in the second band pass filter group 16 for a predetermined installation space.

Figure 3A:
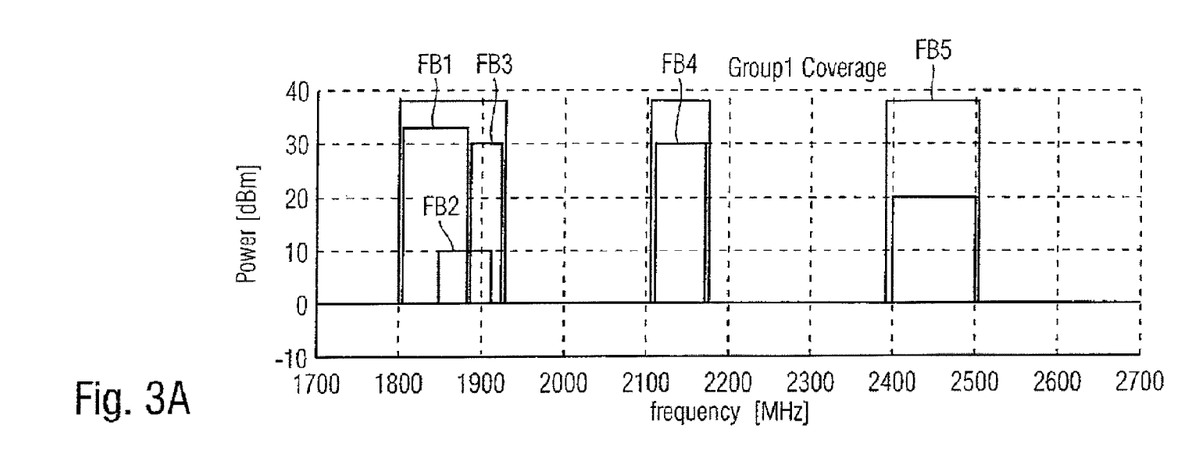
FIGS. 3A, 3B are frequency spectra for illustrating one possible embodiment of the device according to the invention.
Figure 3B:
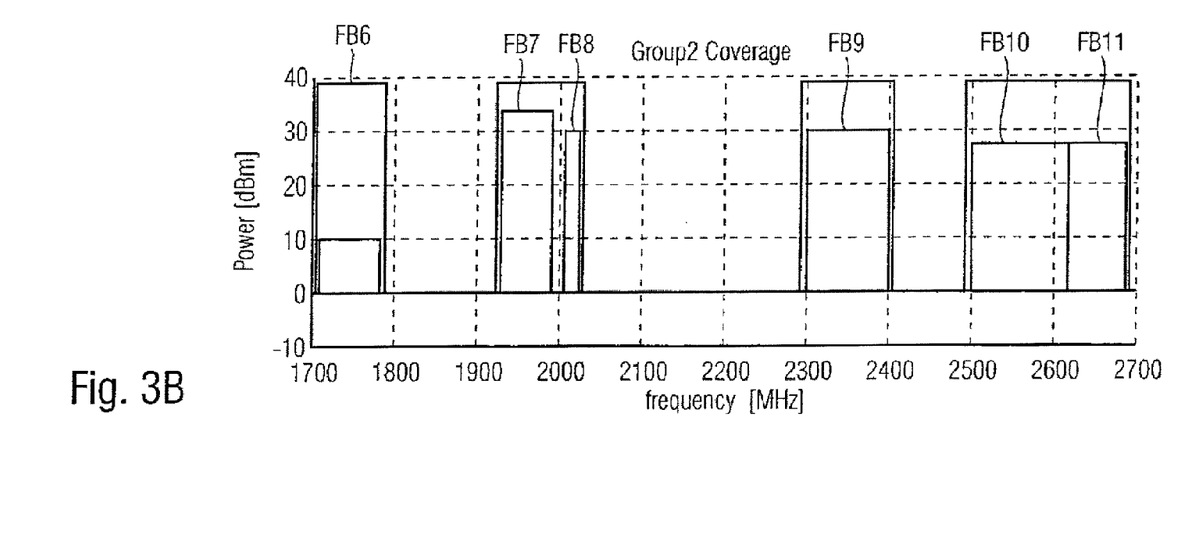

FIGS. 3A, 3B are frequency spectra for illustrating one possible embodiment of the device 1 according to the invention. The signal spectra shown in the range from 1700 to 2700 MHz comprise various radiofrequency bands FB, in particular WLAN frequency bands and mobile radio frequency bands. The frequency band FB1 is a GSM 1800 transmission frequency band, which overlaps in part with a frequency band FB2. This frequency band FB2 is a GSM 1900 reception frequency band. A frequency band FB3 is also provided which is directly adjacent to the frequency band FB1. FIG. 3A further shows a UMTS frequency band FB4 and a WLAN frequency band FB5.

FIG. 3B shows further frequency bands which are in the same frequency range of 1700 to 2700 MHz. The frequency band FB6 is a GSM 1800 reception frequency band. The frequency band FB7 is a GSM 1900 transmission frequency band. Adjacent thereto is a frequency band FB8, which is a UMTS-CDMA frequency band. A frequency band FB9 is further shown, and is a Chinese mobile radio frequency band. A further frequency band FB10 is a 4G mobile radio band, with which an existing mobile radio band FB11 is extended. Some of the frequency bands FB shown in FIGS. 3B, 3A are positioned close together, as can be seen from the figures. Separate band pass filter groups are provided for mutually adjacent frequency bands, and comprise frequency-offset band pass filters arranged in succession and are each connected to an input of a directional coupler, for example the directional coupler 17. The directional coupler 17 combines the signal spectra—which originate from different band pass filter groups, for example the band pass filter groups 15, 16—of filtered high-frequency signals and passes them to a shared transmitting and receiving antenna, for example to the transmitting and receiving antenna 5-1. The frequency bands FB which are positioned close together are thus filtered by band pass filters of separate band pass filter groups, for example the band pass filter groups 15, 16, which comprise mutually frequency-offset band pass filters for rectifying the mutually adjacent frequency bands. To a certain extent, the band pass filters are mutually frequency-offset in a comb-like manner, as is shown in FIGS. 3A, 3B.

Figure 4:
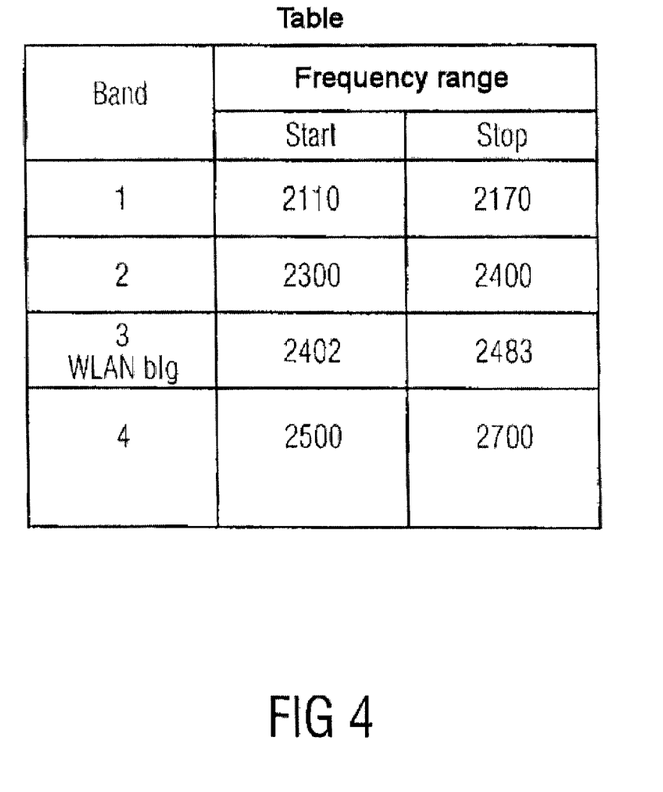
FIG. 4 is a table of possible frequency bands for illustrating one possible embodiment of the device according to the invention.

FIG. 4 is a table of possible frequency bands FB with the associated bandwidths BW thereof as found in one possible embodiment of the device 1 according to the invention. Each frequency band lies between a start frequency and a stop frequency and has a particular frequency bandwidth BW. Bringing together all of the OBCE and WLAN b/g signals requires sufficient high-frequency isolation of the signal sources from one another, as is provided by the device 1 according to the invention.

With the device 1 according to the invention, by way of the special arrangement of filters, directional couplers and two band pass filter groups, comprising band pass filters which are mutually offset in a comb-like manner, as well as two leaky line antennas 5-1, 5-2, all of the telephone and wireless LAN frequencies which are found worldwide can be covered in an aeroplane cabin 3 and can be used by passengers. In addition, the notch filters which have previously been used are not required in the device 1 according to the invention. This leads to a reduction in transmission loss. By way of the wireless system architecture according to the invention, radiofrequency bands for data transmission and mobile radio frequency bands can be brought together to a shared transmitting and receiving antenna, without performance losses for the WLAN channels.

The device 1 according to the invention is suitable above all for use in aeroplanes, but can also be used in other transmission systems in which radiofrequency signals, which are transmitted or received in various preceding radiofrequency bands, are transmitted via a shared transmitting and receiving antenna. The device 1 or system architecture according to the invention is thus also suitable for transmission systems which broadcast and receive WLAN signals and mobile radio signals, of which the frequency bands are positioned close together, via the same transmitting and receiving antenna. The device 1 or system architecture according to the invention is suitable in particular for transmitting and receiving WLAN IEEE 802.11b/g signals and mobile radio signals, in particular 4G mobile radio signals, via the same transmitting and receiving antenna.

What is claimed is:

1. A device for providing radiofrequency signal connections for users in an aircraft, comprising:
    a first shared transmitting and receiving antenna, which is configured so as to transmit and receive wireless local area network signals and mobile radio signals in the aircraft;
    a first wireless local area network access point in the aircraft, which is connected to the first shared transmitting and receiving antenna via a first transmission and reception path, which comprises a first channel filter for filtering a first wireless local area network channel and a first band pass filter; and
    a second wireless local area network access point in the aircraft, which is connected to the first shared transmitting and receiving antenna via a second transmission and reception path, which comprises a second channel filter for filtering a second wireless local area network channel and a second band pass filter,
    wherein the first band pass filter is arranged in a first band pass filter group, which is configured so as to transmit first mobile radio frequency bands,
    wherein the average frequency of the first wireless local area network channel is at a greater distance than the average frequency of the second wireless local area network channel from the frequencies of the first mobile radio frequency bands.

2. The device according to claim 1, further comprising a third wireless local area network access point, which is connected to the second band pass filter via a third channel filter for filtering a third wireless local area network channel.

3. The device according to claim 2, further comprising a signal combiner, which is configured so as to combine the wireless local area network signals which are emitted from the second and the third channel filter.

4. The device according to claim 2, wherein the first, second and third wireless local area network channels each have a frequency bandwidth of 20 MHz.

5. The device according to claim 3, wherein the signal combiner is a Wilkinson coupler.

6. The device according to claim 3, wherein the distance between the average frequencies of the second and third wireless local area network channel is greater than the distance between the average frequencies of the first and the second wireless local area network channel.

7. The device according to claim 1, wherein the second band pass filter is arranged in a second band pass filter group, which is configured so as to transmit two mobile radio frequency bands, and wherein the distance between the average frequencies of the first wireless local area network channel and the first mobile radio frequency bands is less than the distance between the average frequencies of the first wireless local area network channel and the second mobile radio frequency bands.

8. The device according to claim 1, further comprising:
a second shared transmitting and receiving antenna;
wherein the first and second wireless local area network access points are connected to the second shared transmitting and receiving antenna.

9. The device according to claim 8, wherein the first shared transmitting and receiving antenna is configured so as to transmit radiofrequency signals, and the second shared transmitting and receiving antenna is configured so as to receive radiofrequency signals.

10. The device according to claim 1, wherein the first and second mobile radio frequency bands comprise mobile radio noise bands, in which noise signals are transmitted, which prevent mobile radio connections of the terminals which are located in the aircraft to terrestrial base stations.

11. The device according to claim 1, further comprising a directional coupler, which is configured so as to bring together the wireless local area network signals and mobile radio signals and transmit them to the first and/or second shared transmitting and receiving antenna.

12. The device according to claim 11, wherein the directional coupler is a 3 dB directional coupler.

13. The device according to claim 11, wherein the directional coupler comprises two outputs, which are each connected via a triplexer to the first shared transmitting and receiving antenna.

14. The device according to claim 12, wherein the directional coupler comprises hybrid combination circuits, Lange couplers, or Wilkinson couplers.

15. The device according to claim 1, wherein the first and second band pass filters comprise coupled cavity resonators and/or ceramic line resonators.

16. The device according to claim 1, wherein the first and second wireless local area network access points in the aeroplane are connected via a network to an aeroplane server, which is connected to a ground station via a satellite link.

17. The device according to claim 1, wherein the wireless local area network signals comprise wireless local area network service signals in accordance with the standard IEEE 802.11g or IEEE 802.11b.

18. The device according to claim 1, wherein the first shared transmitting and receiving antenna is a leaky line antenna, which is laid in a passenger cabin of the aircraft.

19. The device according to claim 18, wherein a measuring means is provided at one end of the leaky line antenna and is configured so as to measure the signal power of high-frequency signals at one end of the leaky line antenna.

20. The device according to claim 1, wherein data is transmitted via the first and second transmission and reception signal paths at a data transfer rate of up to 54 Mbit/s in each case.

21. The device according to claim 1, wherein the first and second channel filters are arranged in a UWBS (universal wireless backbone system) unit or RF combination unit.

22. The device according to claim 1, wherein the first and second band pass filters are arranged in an OBCE (on-board control equipment) unit of the aircraft.

23. The device according to claim 1, wherein the first and second mobile radio frequency bands are 4G mobile radio frequency bands.

* * * * *